(12) United States Patent
Næsje et al.

(10) Patent No.: US 10,547,966 B2
(45) Date of Patent: Jan. 28, 2020

(54) METHODS AND APPARATUSES FOR COMMUNICATION BETWEEN ELECTRONIC VEHICLE SUPPLY EQUIPMENT AND WIRELESS DEVICE

(71) Applicant: ZAPTEC AS, Stavanger (NO)

(72) Inventors: Kjetil Næsje, Sandnes (NO); Brage W. Johansen, Røyneberg (NO); Vegard Valebjørg, Klepp Stasjon (NO)

(73) Assignee: Zaptec AS, Stavanger (NO)

( * ) Notice: Subject to any disclaimer, the term of this patent is extended or adjusted under 35 U.S.C. 154(b) by 0 days.

(21) Appl. No.: 15/741,421

(22) PCT Filed: Jul. 4, 2016

(86) PCT No.: PCT/EP2016/065669
§ 371 (c)(1),
(2) Date: Jan. 2, 2018

(87) PCT Pub. No.: WO2017/005678
PCT Pub. Date: Jan. 12, 2017

(65) Prior Publication Data
US 2018/0376280 A1 Dec. 27, 2018

(30) Foreign Application Priority Data
Jul. 3, 2015 (NO) .................................. 20150863

(51) Int. Cl.
| | |
|---|---|
| H04W 24/00 | (2009.01) |
| H04W 4/021 | (2018.01) |
| H04W 4/029 | (2018.01) |
| H04W 4/80 | (2018.01) |
| H04W 4/40 | (2018.01) |

(52) U.S. Cl.
CPC .......... *H04W 4/021* (2013.01); *H04W 4/029* (2018.02); *H04W 4/40* (2018.02); *H04W 4/80* (2018.02)

(58) Field of Classification Search
CPC ......... H04W 4/021; H04W 4/40; H04W 4/80; H04W 4/029; H04W 4/046; H04W 4/023; H04L 67/12; H04L 67/18
USPC ............................. 455/456.1–456.3; 370/338
See application file for complete search history.

(56) References Cited

U.S. PATENT DOCUMENTS

| | | | |
|---|---|---|---|
| 2014/0125279 A1* | 5/2014 | Juhasz | H02J 7/00 320/109 |
| 2015/0015419 A1 | 1/2015 | Halker et al. | |
| 2015/0042168 A1* | 2/2015 | Widmer | B60L 11/1829 307/104 |

FOREIGN PATENT DOCUMENTS

WO WO2013057587 A2 4/2013

OTHER PUBLICATIONS

International Search Report and Written Opinion dated Sep. 5, 2016, for corresponding International Application No. PCT/EP2016/065669; International Filing Date: Jul. 4, 2016 consisting of 13-pages.

* cited by examiner

*Primary Examiner* — Marcos Batista
(74) *Attorney, Agent, or Firm* — Christopher & Weisberg, P.A.

(57) ABSTRACT

Location based services to users of electric vehicles (114) are facilitated. Users that are in possession of a wireless communication device (116) may receive RF signals in the form of beacons (109) transmitted by an EVSE (102). The information contained in the signals may be used to facilitate for the user when the user wishes to take advantage of (Continued)

different services (132,134,136), nearby the EVSE (102) as well as further away from the EVSE (102).

13 Claims, 3 Drawing Sheets

METHODS AND APPARATUSES FOR COMMUNICATION BETWEEN ELECTRONIC VEHICLE SUPPLY EQUIPMENT AND WIRELESS DEVICE

CROSS-REFERENCE TO RELATED APPLICATIONS

This application is a Submission under 35 U.S.C. § 371 for U.S. National Stage Patent Application of, and claims priority to, International Application Number PCT/EP2016/065669 entitled METHODS AND APPARATUSES FOR COMMUNICATION BETWEEN ELECTRONIC VEHICLE SUPPLY EQUIPMENT AND WIRELESS DEVICE, filed Jul. 4, 2016, which is related to and claims priority to Norwegian Patent Number 20150863, filed Jul. 3, 2015, the entirety of all of which are incorporated herein by reference.

TECHNICAL FIELD

Embodiments herein relate to methods and arrangements that facilitate access of at least one service that is associated with the geographic location of an Electric Vehicle Supply Equipment, EVSE, by the use of radio frequency, RF, transmissions.

BACKGROUND

The owners of plug-in electric and hybrid electric vehicles typically have a dedicated charging station at home or other location where the vehicle is normally garaged. Infrastructure for public charging stations is getting more and more common, wherein charging stations are accessible and usable by a plurality of drivers of vehicles, for example at commercial buildings, shopping malls, multi-unit dwellings, governmental facilities and other locations. In some implementations EVSEs are equipped with digital processing capabilities and communication arrangements, wireless and/or wired, whereby the EVSE is connected to the internet and provided with internet protocol, IP, addresses. By this, the EVSEs make up local grids of Internet access points. However, these internet connected EVSEs have limited capabilities. For example, they are typically able only to perform simple functions related to charging the users for the electric energy obtained from public EVSEs.

The prior art includes a system for parking spot coordination as described in the international patent application publication WO 2014/072909 and systems for setting zone-dependent operational parameters of a mobile terminal as described in the international patent application publication WO 2002/013557.

SUMMARY

In view of the above, an object of the present disclosure is to overcome or at least mitigate at least some of the drawbacks related to prior art EVSE.

This is achieved in one aspect by a method performed by an electric vehicle supply equipment, EVSE. The method comprises transmitting a radio frequency, RF, signal. The RF signal comprises information for use by a wireless communication device when accessing at least one service that is associated with the geographic location of the EVSE. The EVSE communicates with the wireless communication device whereby the accessing of the at least one service by the wireless communication device is facilitated.

In a second aspect there is provided a method performed by a wireless communication device. The method performed by the wireless communication device comprises receiving an RF signal from an EVSE. The signal comprises information for use by the wireless communication device when accessing at least one service that is associated with the geographic location of the EVSE. The information received from the EVSE is analyzed, whereby at least an identity of the EVSE is obtained. A geographic location is obtained that is associated with the EVSE. The at least one service that is associated with the geographic location associated with the EVSE is then accessed.

In other words, location based services to users of electric vehicles are facilitated. Such users that are in possession of a wireless communication device may receive RF signals in the form of, e.g., "beacons" transmitted by an EVSE. The information contained in the signals may be used to facilitate for the user when the user wishes to take advantage of different services, nearby the EVSE as well as further away from the EVSE.

In another aspect there is provided an EVSE comprising radio frequency control circuitry, a processor and a memory. The memory contains instructions executable by the processor whereby the EVSE is operative to perform the method as summarized above.

In another aspect there is provided a wireless communication device comprising radio frequency control circuitry, a processor and a memory. The memory contains instructions executable by the processor whereby the wireless communication device is operative to perform a method as summarized above.

In further aspects there are provided computer programs and carriers that correspond to the methods summarized above.

DETAILED DESCRIPTION

Figure 1:
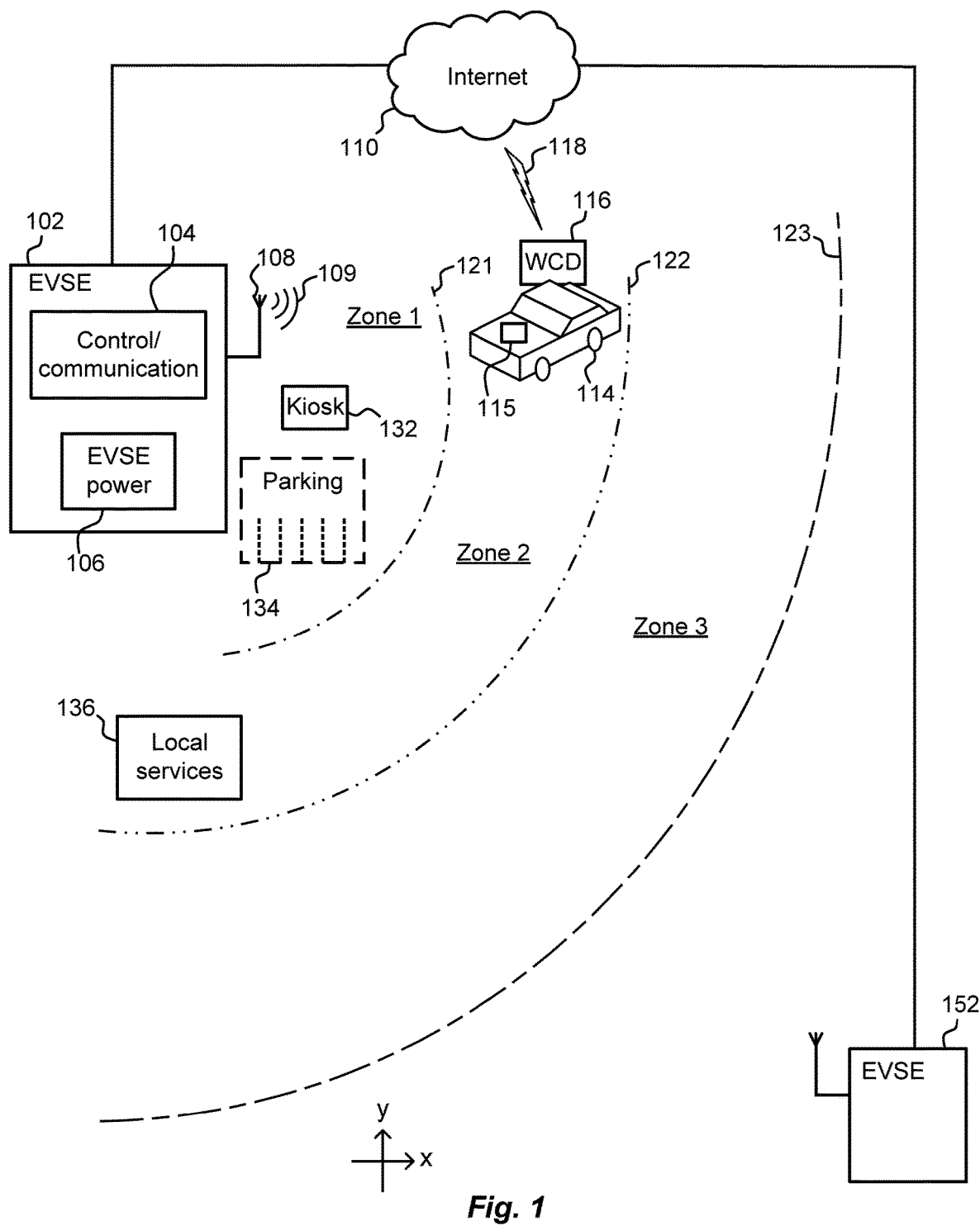
FIG. 1 schematically illustrates an EVSE environment.

With reference to FIG. 1, the present disclosure relates to an Electric Vehicle Supply Equipment, EVSE, 102 that is configured to provide services to a user of a wireless communication device 116 such as a smartphone, tablet and other similar communication devices capable of communicating via a wireless interface 118 with the Internet 110. Needless to say, details regarding how such a wireless communication device 116 may communicate with the Internet 110 is outside the scope of the present disclosure and the skilled person will realize that such communication may be realized via appropriate wireless standards such as any third generation partnership project, 3GPP, standard or similar long range or shorter range radio communication standards.

Typically, such a user having control of the wireless communication device 116 will be a driver of a vehicle 114 that is powered by an electric motor and which vehicle will need electric power charging at regular intervals at the EVSE 102 or at some other EVSE as illustrated by EVSE 152 in FIG. 1. As will be exemplified below, the type and content of these services may be dependent on a geographical relation between the EVSE 102 and the wireless communication device 116, for example a spatial distance, by emitting RF signals. This enables the wireless communication devices to perform actions when in close proximity or further away from the EVSE, such as accessing different types of services. The EVSE may broadcast a unique identifier which can be received by the wireless communication device 116 and such an identifier may trigger a location-based action on the wireless communication device such as a push notification. It is to be noted that the vehicle 114 may also be equipped with a, more or less built-in, wireless communication device 115 that is similar to the wireless communication device 116.

The EVSE 102 comprises a power supply system 106 for providing electric power when charging an electric vehicle such as vehicle 114. Details regarding the power supply system 106 is outside the scope of the present disclosure The EVSE 102 further comprises control and communication circuitry 104, typically including a processor and memory as will be exemplified below. The control and communication circuitry 104 operates by way of software to control radio emission via an antenna 108. The radio emission from the antenna 108 may follow a radio communication standard such as Bluetooth, Bluetooth Low Energy, Wi-Fi, ZigBee, Z-wave or similar standards. In the following, RF signal transmission by the EVSE 102 will be referred to as a beacon 109 emitted via the antenna 108. The EVSE 102 is connected to the internet 110 via a fixed connection or a wireless connection. Although FIG. 1 exemplifies the internet connection as a direct connection, an alternative way of connecting the EVSE 102 to the internet 110 is via an internet connection provided (e.g. temporarily) by the wireless communication device 116, using a suitable radio communication standard connection via the control and communication circuitry 104 and the antenna 108.

Figure 2:
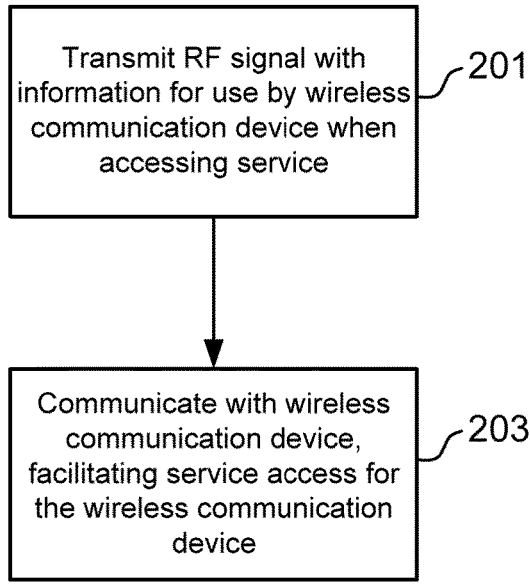
FIG. 2 is a flowchart of a method performed by an EVSE.
Figure 3:
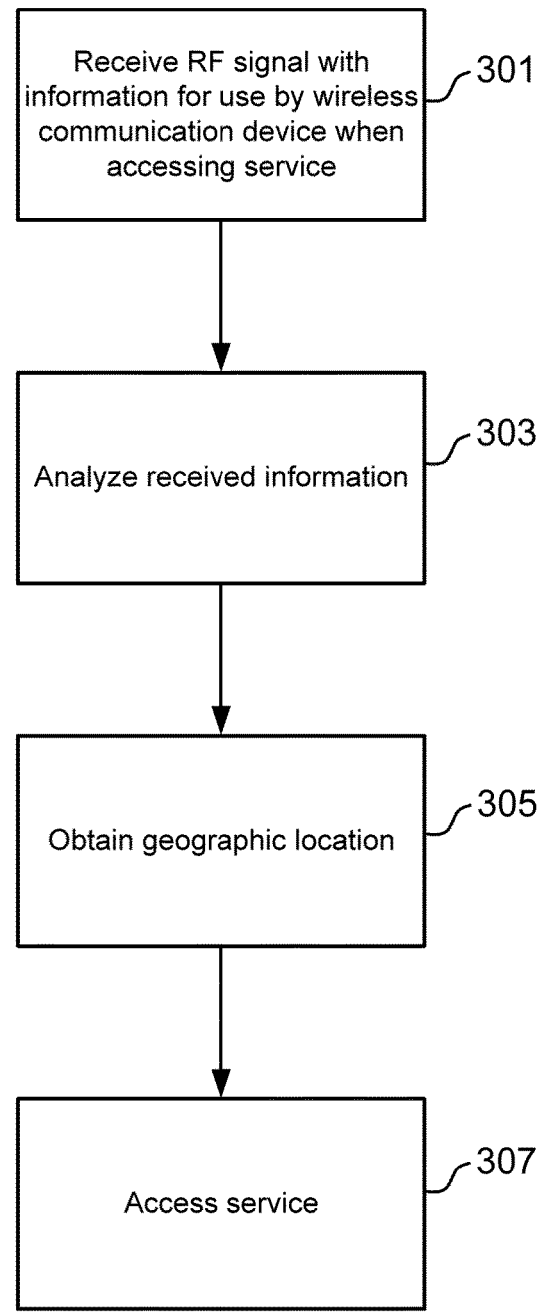
FIG. 3 is a flowchart of a method performed by a wireless communication device.

Turning now to FIGS. 2 and 3, methods performed by the EVSE 102 and the wireless communication device 116 will be described. First, in FIG. 2, a method performed by the EVSE 102 will be described in some exemplifying details. The method comprises a number of actions, as the boxes in the flowchart in FIG. 2 illustrate. The actions comprise:

Action 201

The EVSE 102 transmits an RF signal comprising information for use by the wireless communication device 116 when the wireless communication device 116 accesses at least one service that is associated with the geographic location of the EVSE.

In various embodiments, the at least one service may be any of a payment service, a local information service and a geographical tracking or routing service.

As mentioned, the RF signal transmitted by the EVSE may be considered as a beacon 109 as illustrated in FIG. 1. The transmission of the RF signal may in various embodiments comprise transmission of any of a Bluetooth signal (e.g. a Bluetooth Low Energy, LE, signal) and a near field communication, NFC, signal.

In some embodiments, the information for use by the wireless communication device 116 may comprise the geographic location of the EVSE 102.

Action 203

The EVSE 102 communicates with the wireless communication device 116 whereby the accessing of the at least one service by the wireless communication device is facilitated.

In some embodiments, the communication with the wireless communication device 116 may comprise communication directly with the wireless communication device 116. In some embodiments, the communication with the wireless communication device 116 may comprise communication via an internet 110 communication path.

In FIG. 3, a method performed by the wireless communication device 116 will be described in some exemplifying details. The method comprises a number of actions, as the boxes in the flowchart in FIG. 3 illustrate. The actions comprise:

Action 301

The wireless communication device 116 receives, from the EVSE 102 an RF signal that comprises information for use by the wireless communication device 116 when accessing at least one service that is associated with the geographic location of the EVSE 102.

For example, the reception of the RF signal may in various embodiments comprise reception of any of a Bluetooth signal (e.g. a Bluetooth Low Energy, LE, signal) and a near field communication, NFC, signal.

Action 303

The wireless communication device 116 analyses the information received from the EVSE 102, whereby at least an identity of the EVSE 102 is obtained.

Action 305

The wireless communication device 116 obtains a geographic location associated with the EVSE 102. For example, the geographic location associated with the EVSE 102 may be obtained from the information received from the EVSE 102.

In some embodiments, the obtaining of the geographic location associated with the EVSE 102 may involve analyzing signal strength of the received RF signal. In such embodiments the geographic location associated with the EVSE 102 may be obtained from the analysis of the signal strength. As will be exemplified below, the geographic location associated with the EVSE 102 may be a distance between the wireless communication device 116 and the EVSE 102.

Action 307

The wireless communication device 116 accesses the at least one service that is associated with the geographic location associated with the EVSE 102.

For example, the accessing of the at least one service may comprise communicating with the EVSE 102.

In some embodiments, the geographic location associated with the EVSE 102 may be a specific geographic zone, among a plurality of geographic zones 121,122,123, in which the wireless communication device 116 is located.

In such embodiments, given the specific geographic zone 121,122,123 in which the wireless communication device 116 is located, the accessing of the at least one service may comprise:
if the wireless communication device 116 is located in a first geographic zone 121, accessing a payment service,
if the wireless communication device 116 is located in a second geographic zone 122, accessing a local information service, and
if the wireless communication device 116 is located in a third geographic zone 123, accessing a geographical tracking or routing service.

As exemplified by the configuration of the zones 121, 122,123 in relation to a spatial/geographical xy-coordinate system in FIG. 1, the first, second and third geographical zones may be associated with a respective first, second and third spatial distance from the EVSE 102, where the first distance is smaller than the second distance and the second distance is smaller than the third distance.

Moreover, although not illustrated in FIG. 1, zones, similar to the zones 121, 122, 123, may be associated with other EVSEs such as the EVSE 152. The wireless communication device 116 may in such a scenario make use of information in RF signals transmitted by a plurality of EVSEs and thereby being enabled to obtain an increased accuracy in geographical location.

Continuing now with reference to FIG. 1 as well as to FIGS. 2 and 3, various exemplifying embodiments will be described in some more detail.

For example, at a very short range, the services that a user of the wireless communication device 116 may wish to use may, e.g., be a payment service, and at distances further away, local information services and geographical routing and tracking services may be accessed. Processor capacity and radio transmitting capacity that commonly are preinstalled in EVSE 102 may be used, and also the grid nature of plural EVSEs typically installed in facilities like parking garages.

For example, the RF signal transmitted by the EVSE may contain at least a unique digital signature. This unique signature may be associated with the exact location of the EVSE 102. The wireless communication device may communicate with an internet 110 service and identify this exact location through the unique signature. However, as mentioned, the information transmitted by the EVSE 102 may also contain such exact location information.

In examples where the signal strength of the RF signal transmitted by the EVSE 102 received by the wireless communication device 116 and/or in examples where several EVSEs, e.g. also EVSE 152, transmit a respective RF signal the relative strength of these plural RF signals that are received by the wireless communication device 116, may be used to determine the wireless communication device 116 distance and/or position relative to the EVSE 102 or relative to several EVSEs in a grid. The relation between RF signal strength(s) at the wireless communication device from one or more EVSE and the distance to the EVSE(s) may be predefined, and then provided to the wireless communication device through the internet connection 118. Because of different reflection of the radio signal, this relation may be different depending on from which EVSE(s) the wireless communication device 116 receives RF signal(s). Table 1 below shows an example of a rough relation between the range of received signal strength (in dBm) at a wireless communication device 116 and the distance range to the EVSE 102 emitting an RF signal with a signal strength of 20 dBm, which is the typical power level of a class 3 Bluetooth device. Table 1 also exemplifies a mapping of the distance value with the three zones 121,122,123 in FIG. 1.

TABLE 1

| Zone | Signal strength | Distance |
|---|---|---|
| 1 | 20-0 dBm | 0-15 m |
| 2 | 0--8 dBm | 15-50 m |
| 3 | -8-10 dBm | 50-100 m |

The distance values may be provided to the wireless communication device 116 by including radio signal strength(s) mapped with unique identification(s) of the transmitting EVSE(s).

As exemplified in FIG. 1 and mentioned above, different services may be provided based on the wireless communication device 116 distance and/or position relative to the EVSE 102 or relative to a plurality of EVSE devices, e.g. also EVSE 152. Here, three different services are offered to the user depending on in which of the three zones, zone 1 121, zone 2 122 or zone 3 123 according to table 1, the wireless communication device 116 is located. As FIG. 1 illustrated, an inner zone of FIG. 1 is referred to as zone 1, a middle zone is referred to as zone 2, and an outer zone is referred to as zone 3.

When the wireless communication device 116 is located within zone 1, a payment service may be offered to the user of the portable device. This may typically be a payment service for using the EVSE power supply system 106 for charging the user's electric vehicle 114. Details of the charging cost etc. may be presented on a display of the wireless communication device and the procedure of paying may follow any appropriate internet based payment procedure. Such a payment service could also include parking fees applicable at a parking place 134 and payment of goods from kiosk machines 132 located within zone 1.

When the wireless communication device 116 is located within zone 2, local relevant information and services 136 may be provided. Examples of such information and services may include information from local stores in the area where the zone is located, advertising, general information of the area etc.

In zone 3, far distance services like tracking and routing may be offered to the user of the wireless communication device 116. Then cross bearing of a plurality signals from several EVSEs could be utilized, e.g. RF signals from both EVSE 102 and EVSE 152 (although a typical grid of EVSEs comprises more than two EVSEs). Once a geographical location of the wireless communication device 116 is found, a route to the nearest parking slot with an EVSE could be created. Such a parking slot may be located in any of the zones 1212,122,123 as well as in a zone associated with any other EVSE, such as a zone (not shown in FIG. 1) associated with EVSE 152. Such tracking and routing may be realized by including, in the transmission of the RF signal by the EVSE 102 (i.e. the beacon 109), an indication of a free parking slot together with the unique identification of the EVSE as mentioned above. The EVSE of the strongest signal strength and at the same time indicating a free parking slot would then be selected by the user. At this time, the location of the wireless communication device 116 and the nearest free parking slot would be known to the user of the vehicle 114. By using a map of the local area (e.g. a parking facility) downloaded via the internet 110 to the wireless communication device 116, a guiding route from the location of the portable device to the nearest parking slot equipped with an EVSE could be provided to the wireless communication device 116.

Figure 4:
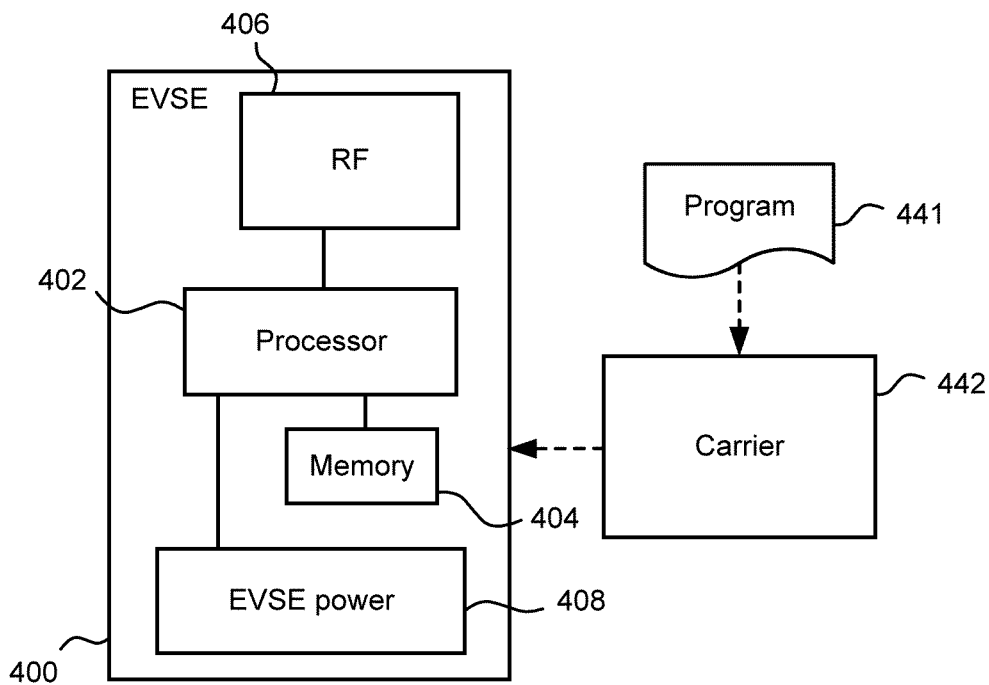
FIG. 4 is a schematically illustrated block diagram of an EVSE.

Turning now to FIG. 4, an EVSE 400 will be described in some more detail. For example, the EVSE 400 may be any of the EVSEs 102, 152 discussed above in connection with FIGS. 1 to 3. The EVSE 400 comprises RF control circuitry 406, a processor 402 and a memory 404. The memory 404 contains instructions executable by the processor 402 whereby the EVSE 400 is operative to:

transmit a radio frequency, RF, signal comprising information for use by a wireless communication device 115,116,500 when accessing at least one service that is associated with the geographic location of the EVSE, and communicate with the wireless communication device whereby the accessing of the at least one service by the wireless communication device is facilitated.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments, the EVSE 400 is operative such that the information for use by the wireless communication device comprises the geographic location of the EVSE.

In some embodiments, the EVSE 400 is operative such that the communication with the wireless communication device comprises communication directly with the wireless communication device.

In some embodiments, the EVSE 400 is operative such that the communication with the wireless communication device comprises communication via an internet communication path.

In some embodiments, the EVSE 400 is operative such that the at least one service is any of a payment service, a local information service, a geographical tracking or routing service.

In some embodiments, the EVSE 400 is operative such that the transmission of the RF signal comprises transmission of any of a Bluetooth signal, a near field communication, NFC, signal.

Figure 5:
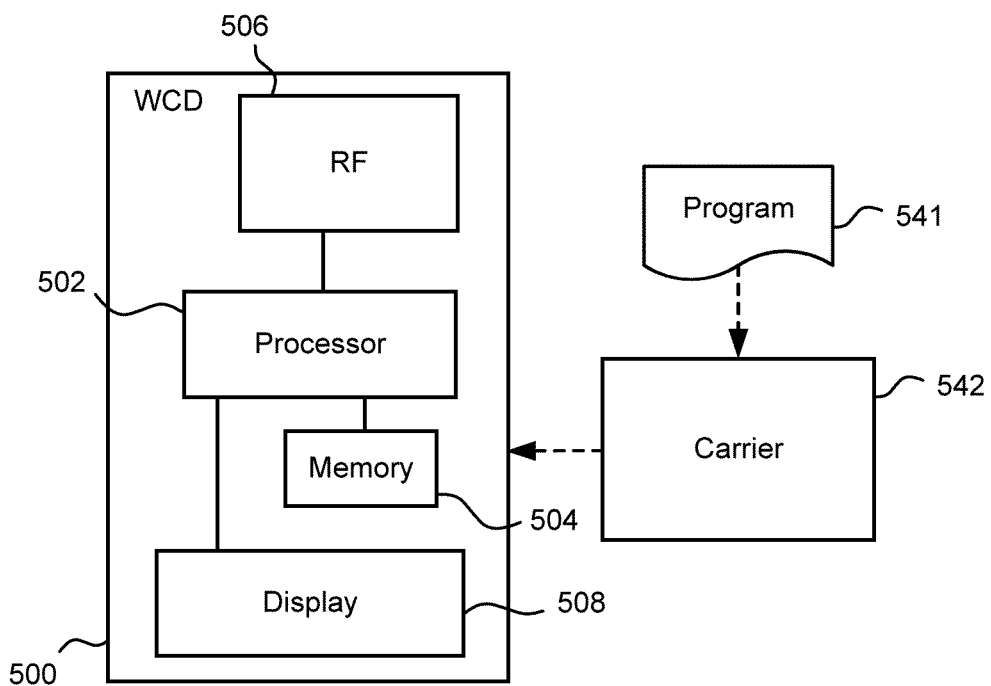
FIG. 5 is a schematically illustrated block diagram of a wireless communication device.

Turning now to FIG. 5, a wireless communication device 500 will be described in some more detail. For example, the wireless communication device 500 may be any of the wireless communication devices 115,116 discussed above in connection with FIGS. 1 to 3. The wireless communication device 500 comprises RF control circuitry 506, a processor 502 and a memory 504. The memory 504 contains instructions executable by the processor 502 whereby the wireless communication device 500 is operative to:

receive, from an electric vehicle supply equipment 102, 400, EVSE, a radio frequency, RF, signal comprising information for use by the wireless communication device when accessing at least one service that is associated with the geographic location of the EVSE, analyze the information received from the EVSE, whereby at least an identity of the EVSE is obtained, obtain a geographic location associated with the EVSE, and access the at least one service that is associated with the geographic location associated with the EVSE.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the wireless communication device 500 is operative such that the geographic location associated with the EVSE is obtained from the received information.

In some embodiments, the wireless communication device 500 is operative to:

analyze signal strength of the received RF signal, and wherein the geographic location associated with the EVSE is obtained from the analysis of the signal strength.

In some embodiments, the wireless communication device 500 is operative such that the geographic location associated with the EVSE is a specific geographic zone, among a plurality of geographic zones, in which the wireless communication device is located.

In some embodiments, the wireless communication device 500 is operative such that the accessing of the at least one service comprises:

if the wireless communication device is located in a first geographic zone, accessing a payment service, if the wireless communication device is located in a second geographic zone, accessing a local information service, and if the wireless communication device is located in a third geographic zone, accessing a geographical tracking or routing service.

In some embodiments, the wireless communication device 500 is operative such that the first, second and third geographical zones are associated with a respective first, second and third spatial distance from the EVSE, where the first distance is smaller than the second distance and the second distance is smaller than the third distance.

In some embodiments, the wireless communication device 500 is operative such that the accessing of the at least one service comprises communicating with the EVSE.

In some embodiments, the wireless communication device 500 is operative such that the reception of the RF signal comprises reception of any of a Bluetooth signal, a near field communication, NFC, signal.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory, RAM, or the like. Furthermore, the term "memory" may refer to an internal register memory of a processor or the like.

As used herein, the term "computer readable medium" may be a Universal Serial Bus, USB, memory, a DVD-disc, a Blu-ray disc, a software module that is received as a stream of data, a Flash memory, a hard drive, a memory card, such as a MemoryStick, a Multimedia Card, MMC, etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by an electric vehicle supply equipment, EVSE, comprising:

transmitting a radio frequency, RF, signal having information for use by a wireless communication device when accessing at least one service that is associated with at least one geographic zone of the EVSE, the at least one service being at least one of the group consisting of:
a payment service;
a local information service; and
a geographical tracking or routing service
the information including the geographic zone of the EVSE in relation to the wireless communication device and the geographic location zone determining which at least one service to access, the plurality of geographic zones including:
a first geographic zone;
a second geographic zone; and
a third geographic zone,
when the wireless communication device is located in the first geographic zone the payment service is accessible, when the wireless communication device is located in the second geographic zone the local information service is accessible, and when the wireless communication device is in the third geographic zone the geographical tracking or routing service is accessible.

2. The method of claim 1, wherein the communication with the wireless communication device further comprises communication directly with the wireless communication device.

3. The method of claim 1, wherein the communication with the wireless communication device further comprises communication via an internet communication path.

4. The method of claim 1, wherein the transmission of the RF signal comprises transmission of at least one of the group consisting of:
a Bluetooth signal; and
a near field communication, NFC, signal.

5. The electric vehicle supply equipment, EVSE, further comprising radio frequency control circuitry, a processor, and a memory, the memory containing instructions executable by the processor where the EVSE is operative to perform the method according to claim 1.

6. A non-transitory computer readable medium, comprising instructions which, when executed on at least one processor in the electric vehicle supply equipment, EVSE, cause the EVSE to carry out the method according to claim 1.

7. A method performed by a wireless communication device comprising:
receiving, from an electric vehicle supply equipment, EVSE, a radio frequency, RF, signal comprising information for use by the wireless communication device when accessing at least one service that is associated with the geographic location of the EVSE in relation to the wireless communication device, the geographic location associated with the EVSE being obtained from the received information and the geographic location being a specific geographic zone, among a plurality of geographic zones where the wireless communication device is located, the plurality of geographic zones including;
a first geographic zone;
a second geographic zone; and
a third geographic zone,
when the wireless communication device is located in the first geographic zone a payment service is accessible, when the wireless communication device is located in the second geographic zone a local information service is accessible, and when the wireless communication device is in the third geographic zone a geographical tracking or routing service is accessible;
analyzing the information received from the EVSE, where at least an identity of the EVSE is obtained;
obtaining a geographic location associated with the EVSE in relation to the wireless communication device; and
accessing the at least one service that is associated with the geographic location associated with the EVSE in relation to the wireless communication device.

8. The method of claim 7, further comprising:
analyzing signal strength of the received RF signal, and where the geographic location associated with the EVSE is obtained from the analysis of the signal strength.

9. The method of claim 7, wherein the first, second, and third geographical zones are associated with a respective first, second, and third spatial distance from the EVSE, where the first distance is smaller than the second distance and the second distance is smaller than the third distance.

10. The method of claim 7, wherein the accessing of the at least one service further comprises communicating with the EVSE.

11. The method of claim 7, wherein the reception of the RF signal further comprises reception of at least one of the group consisting of:
a Bluetooth signal; and
a near field communication, NFC, signal.

12. The wireless communication device further comprising radio frequency control circuitry, a processor, and a memory, the memory containing instructions executable by the processor where the wireless communication device is operative to perform the method according to claim 7.

13. A non-transitory computer readable medium, comprising instructions which, when executed on at least one processor in a wireless communication device, cause the wireless communication device to carry out the method according to claim 7.

* * * * *